US010400695B2

(12) United States Patent
Yamaguchi et al.

(10) Patent No.: US 10,400,695 B2
(45) Date of Patent: Sep. 3, 2019

(54) EXHAUST GAS CONTROL SYSTEM OF INTERNAL COMBUSTION ENGINE AND METHOD OF CONTROLLING EXHAUST GAS CONTROL SYSTEM OF INTERNAL COMBUSTION ENGINE

(71) Applicant: Toyota Jidosha Kabushiki Kaisha, Toyota-shi, Aichi-ken (JP)

(72) Inventors: Yuji Yamaguchi, Susono (JP); Yoshihisa Shinoda, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/858,326

(22) Filed: Dec. 29, 2017

(65) Prior Publication Data

US 2018/0195447 A1 Jul. 12, 2018

(30) Foreign Application Priority Data

Jan. 11, 2017 (JP) ................................ 2017-002811

(51) Int. Cl.

*F02D 41/12* (2006.01)
*F02D 41/02* (2006.01)
*F02D 41/00* (2006.01)
*F02D 41/14* (2006.01)

(52) U.S. Cl.

CPC ..... *F02D 41/0295* (2013.01); *F02D 41/0005* (2013.01); *F02D 41/0052* (2013.01); *F02D 41/0055* (2013.01); *F02D 41/123* (2013.01); *F02D 41/126* (2013.01); *F02D 41/1441* (2013.01); *F02D 2200/0406* (2013.01); *F02D 2200/0814* (2013.01); *Y02A 50/2324* (2018.01); *Y02T 10/22* (2013.01); *Y02T 10/47* (2013.01)

(58) Field of Classification Search

CPC .. F02D 41/123; F02D 41/126; F02D 41/0005; F01N 3/101

See application file for complete search history.

(56) References Cited

U.S. PATENT DOCUMENTS 6,148,611 A 11/2000 Sato
2010/0235074 A1 * 9/2010 Shinagawa ........... F02D 41/126 701/108

FOREIGN PATENT DOCUMENTS

| | | | |
|---|---|---|---|
| JP | H09209844 | A | 8/1997 |
| JP | H11-101144 | A | 4/1999 |
| JP | H11280457 | A | 10/1999 |
| JP | 2005-264927 | A | 9/2005 |
| JP | 2006-316706 | A | 11/2006 |
| JP | 2009-114957 | A | 5/2009 |
| WO | 2009/060287 | A2 | 5/2009 |

* cited by examiner

*Primary Examiner* — Jonathan R Matthias
(74) *Attorney, Agent, or Firm* — Dinsmore & Shohl LLP

(57) ABSTRACT

An exhaust gas control system of an internal combustion engine includes an EGR device, a three-way catalyst, and an electronic control unit. The electronic control unit is configured to control the air-fuel ratio of the exhaust gas flowing into the three-way catalyst such that the air-fuel ratio when the electronic control unit executes EGR control during execution of fuel cut control and then executes the enrichment processing after the execution of the fuel cut control ends to be a higher air-fuel ratio in a range of the rich air-fuel ratio compared to the air-fuel ratio when the EGR control is not executed during the execution of the fuel cut control.

3 Claims, 5 Drawing Sheets

EXHAUST GAS CONTROL SYSTEM OF INTERNAL COMBUSTION ENGINE AND METHOD OF CONTROLLING EXHAUST GAS CONTROL SYSTEM OF INTERNAL COMBUSTION ENGINE

CROSS-REFERENCE TO RELATED APPLICATIONS

This application claims priority to Japanese Patent Application No. 2017-002811 filed on Jan. 11, 2017, incorporated herein by reference in its entirety.

BACKGROUND

1. Technical Field

The present disclosure relates to an exhaust gas control system of an internal combustion engine including a three-way catalyst provided in an exhaust passage of the internal combustion engine, and a method of controlling an exhaust gas control system of an internal combustion engine.

2. Description of Related Art

In internal combustion engines of the related art, EGR control in which a portion of gas (exhaust gas) flowing through an exhaust passage is introduced into an intake passage through an EGR passage is executed. Additionally, in the internal combustion engines, there is a case where so-called fuel cut control in which fuel injection in an internal combustion engine is stopped at a deceleration operation is executed. A technique of executing the EGR control during the execution of the fuel cut control is disclosed in Japanese Unexamined Patent Application Publication No. 9-209844 (JP 9-209844 A).

When the EGR control is executed during the execution of the fuel cut control as in the above technique, gas containing exhaust gas (burnt gas) discharged from an internal combustion engine immediately before start of the execution of the fuel cut control circulates through the exhaust passage, the EGR passage, and the intake passage. Then, the gas containing the burnt gas flows through the exhaust passage. On the other hand, in a case where the EGR control is not executed during the execution of the fuel cut control, solely fresh air (air) newly flowing into the internal combustion engine flows through the exhaust passage during the execution of the fuel cut control. For that reason, in the case where the EGR control is executed during the execution of the fuel cut control, the oxygen concentration of gas flowing into an exhaust gas control catalyst provided in the exhaust passage during the execution of the fuel cut control can be lowered compared to that in the case where the EGR control is not executed during the execution of the fuel cut control. According to this, the oxidation reaction of the exhaust gas control catalyst in the under execution of fuel cut control can be more effectively suppressed, a rise in the temperature of the exhaust gas control catalyst caused by the oxidation reaction can be more effectively suppressed. As a result, the progress of deterioration of the exhaust gas control catalyst can be more effectively suppressed.

SUMMARY

When the fuel cut control is executed in a case where the exhaust passage of the internal combustion engine is provided with a three-way catalyst serving as the exhaust gas control catalyst, a large amount of oxygen is held by the three-way catalyst during the execution of the fuel cut control. As a result, there is a case where the three-way catalyst is brought into an oxygen excess state for a while even after the end of the execution of the fuel cut control (that is, until the oxygen held by the three-way catalyst is consumed by the oxidation of fuel components in the exhaust gas). In this case, while the three-way catalyst is in an oxygen excess state, it becomes difficult for the three-way catalyst to sufficiently exhibit its exhaust gas control function.

Thus, in order to eliminate the oxygen excess state of the three-way catalyst after the end of the execution of the fuel cut control, there is a case where the enrichment processing of making the air-fuel ratio of the exhaust gas flowing into the three-way catalyst lower than a stoichiometric air-fuel ratio is executed. By executing the enrichment processing, the oxygen held by the three-way catalyst can be consumed at an earlier stage. For that reason, after the end of the execution of the fuel cut control, the state of the three-way catalyst can be recovered to a state where the exhaust gas control function of the three-way catalyst can be sufficiently exhibited at an earlier stage.

However, in a case where the enrichment processing is executed after the end of the execution of the fuel cut control, there is a case that a fuel component that is not used for the consumption of oxygen (a fuel component that is not oxidized in the three-way catalyst) among fuel components supplied to the three-way catalyst with the enrichment processing flows out of the three-way catalyst. Hereinafter, there is also a case where the fuel component flowing out of the three-way catalyst without being used for the consumption of oxygen in the three-way catalyst is referred to as a "slip-through fuel component".

Here, as described above, in the case where the EGR control is executed during the execution of the fuel cut control, the oxygen concentration of gas flowing into the three-way catalyst decreases compared to that in the case where the EGR control is not executed. Then, when the oxygen concentration of the gas flowing into the three-way catalyst varies, an oxygen holding state in the three-way catalyst is also brought into a different state. For that reason, in the case where the EGR control is executed during the execution of the fuel cut control, when the enrichment processing is executed after the end of the execution of the fuel cut control similar to the case where the EGR control is not executed during the execution of the fuel cut control, there is a possibility that the slip-through fuel component will increase.

The disclosure provides an exhaust gas control system of an internal combustion engine and a method of controlling an exhaust gas control system of an internal combustion engine that more suitably recover the exhaust gas control function of the three-way catalyst after the end of the execution of fuel cut control in a configuration in which the exhaust passage of the internal combustion engine is provided with the three-way catalyst.

In the disclosure, in the cases where the EGR control is executed and is not executed during the execution of the fuel cut control, in the enrichment processing to be executed after the end of the execution of the fuel cut control, the air-fuel ratio of exhaust gas (hereinafter may be referred to as "inflow exhaust gas") flowing into the three-way catalyst is adjusted to a different air-fuel ratio.

A first aspect of the disclosure relates to an exhaust gas control system of an internal combustion engine. The exhaust gas control system includes an EGR device, a three-way catalyst, and an electronic control unit. The EGR device includes an EGR passage provided to allow an exhaust passage and an intake passage in the internal combustion engine to communicate with each other. The three-way catalyst is provided in the exhaust passage. The electronic control unit is configured to execute fuel cut control in which fuel injection in the internal combustion engine is stopped at a deceleration operation of the internal combustion engine. The electronic control unit is configured to execute enrichment processing in which an air-fuel ratio of exhaust gas flowing into the three-way catalyst is lowered to a rich air-fuel ratio lower than a stoichiometric air-fuel ratio after the execution of the fuel cut control ends. The electronic control unit is configured to execute EGR control on the EGR device during the execution of the fuel cut control when a predetermined EGR condition is satisfied at a start of the execution of the fuel cut control. The EGR control is control of introducing a portion of gas flowing through the exhaust passage into the intake passage through the EGR passage. The electronic control unit is configured to control the air-fuel ratio of the exhaust gas flowing into the three-way catalyst such that the air-fuel ratio when the electronic control unit executes the EGR control during the execution of the fuel cut control and then executes the enrichment processing after the execution of the fuel cut control ends to be a higher air-fuel ratio in a range of the rich air-fuel ratio compared to the air-fuel ratio when the EGR control is not executed during the execution of the fuel cut control.

According to the first aspect of the disclosure, the electronic control unit executes the EGR control of the EGR device during the execution of the fuel cut control in the case where the predetermined EGR condition is satisfied at a start of the execution of the fuel cut control. Here, the predetermined EGR condition is a condition at which it is possible to determine that there is a possibility that an oxidation reaction in the three-way catalyst is promoted due to a large amount of oxygen being supplied to the three-way catalyst during the execution of the fuel cut control during the execution of the fuel cut control and consequently, the temperature of the three-way catalyst rises excessively when the EGR control of the EGR device is not executed during the execution of the fuel cut control. In a case where the predetermined EGR condition is satisfied at the start of the execution of the fuel cut control, the oxygen concentration of the gas (hereinafter may be referred to as "inflow gas") flowing into the three-way catalyst can be lowered by executing the EGR control during the execution of the fuel cut control. That is, the amount of the oxygen to be supplied to the three-way catalyst during the execution of the fuel cut control can be reduced. For that reason, the temperature of the three-way catalyst can be more effectively kept from rising excessively due to the oxidation reaction during the execution of the fuel cut control.

That is, as described above, in the case where the EGR control is executed during the execution of the fuel cut control, the oxygen concentration of the inflow gas decreases compared to that in the case where the EGR control is not executed. Here, oxygen is more easily held solely in a portion near a surface layer in the three-way catalyst as the oxygen concentration of the inflow gas is lower during the execution of the fuel cut control. Additionally oxygen is more easily held up to the inside of the three-way catalyst as well as the portion near the surface layer of the three-way catalyst, as the oxygen concentration of the inflow gas is higher. This is because the frequency at which oxygen collides against an oxygen holding material in the three-way catalyst decreases as the oxygen concentration of the inflow gas is lower and the frequency at which oxygen collides against the oxygen holding material in the three-way catalyst increases as the oxygen concentration of the inflow gas is higher.

For that reason, in the case where the EGR control is not executed during the execution of the fuel cut control, oxygen is easily held up to the inside of the three-way catalyst as well as the portion near the surface layer of the three-way catalyst, at the end of the execution of the fuel cut control. On the other hand, in the case where the EGR control is executed during the execution of the fuel cut control, oxygen is easily held solely in the portion near the surface layer of the three-way catalyst, at the end of the execution of the fuel cut control.

For this reason, in the enrichment processing to be executed by the electronic control unit after the end of the execution of the fuel cut control, when the air-fuel ratio of the inflow exhaust gas in the case where the EGR control is executed during the execution of the fuel cut control is lowered to the same extent as the air-fuel ratio in the case where the EGR control is not executed during the execution of the fuel cut control, there is a case where the amount of supply of the fuel component per unit time to the three-way catalyst increases excessively with respect to the oxygen holding state in the three-way catalyst. As a result, there is a possibility that the slip-through fuel component resulting from the enrichment processing will increase.

In other words, in the case where the EGR control is executed during the execution of the fuel cut control, the fuel components for sufficiently consuming the oxygen held in the three-way catalyst can be supplied to the three-way catalyst, even when the air-fuel ratio of the inflow exhaust gas is controlled to be a higher value in the range of the rich air-fuel ratio, compared to that in the case where the EGR control is not executed during the execution of the fuel cut control, in the enrichment processing to be executed after the end of the execution of the fuel cut control.

That is, the electronic control unit performs control such that, in a case where the EGR control is executed during the execution of the fuel cut control when the enrichment processing is executed after the end of the execution of the fuel cut control, the air-fuel ratio of the inflow exhaust gas is controlled to be a higher air-fuel ratio in the range of the rich air-fuel ratio compared to that in the case where the EGR control is not executed during the execution of the fuel cut control (that is, the degree of enrichment of the inflow exhaust gas is made low). According to the above description, the oxygen held by the three-way catalyst can be consumed at an early stage, and an increase in the slip-through fuel component can be more effectively suppressed. That is, the state of the three-way catalyst can be recovered to a state where the exhaust gas control function of the three-way catalyst can be sufficiently exhibited as early as possible while an increase in the slip-through fuel component is more efficiently suppressed. Hence, the exhaust gas control function of the three-way catalyst can be more suitably recovered after the end of the execution of the fuel cut control.

For that reason, in the case where the EGR control is executed during the execution of the fuel cut control by the electronic control unit, the oxygen concentration of the inflow gas during the execution of the fuel cut control varies according to the operational state of the internal combustion engine immediately before the start of the execution of the fuel cut control, the amount of intake air of the internal combustion engine during the execution of the fuel cut control, or the like. Then, as described above, according to the oxygen concentration of the inflow gas during the execution of the fuel cut control, the oxygen holding state in the three-way catalyst at the end of the execution of the fuel cut control is also brought into a different state.

In the exhaust gas control system according to the first aspect of the disclosure, the electronic control unit may control the air-fuel ratio of the inflow exhaust gas in the enrichment processing to be executed after the end of the fuel cut control to be a different value based on the oxygen concentration of the inflow gas at the end of the execution of the fuel cut control, in the case where the EGR control is executed during the execution of the fuel cut control. That is, when the electronic control unit executes the EGR control during the execution of the fuel cut control and then executes the enrichment processing after the execution of the fuel cut control ends, the electronic control unit may be configured to control the air-fuel ratio of the exhaust gas flowing into the three-way catalyst such that the air-fuel ratio when the oxygen concentration of the gas flowing into the three-way catalyst at the end of the execution of the fuel cut control is low to be a higher air-fuel ratio in the range of the rich air-fuel ratio compared to the air-fuel ratio when the oxygen concentration of the gas is high (that is, the degree of enrichment of the exhaust gas may be made low).

By executing the enrichment processing as described above in the case where the EGR control is executed during the execution of the fuel cut control, the state of the three-way catalyst can be recovered to a state where the exhaust gas control function of the three-way catalyst can be sufficiently exhibited as early as possible while an increase in the slip-through fuel component is more effectively suppressed.

A second aspect of the disclosure relates to a method of controlling an exhaust gas control system of an internal combustion engine. The exhaust gas control system includes an EGR device, a three-way catalyst, and an electronic control unit. The EGR device includes an EGR passage. The EGR passage is provided to allow an exhaust passage and an intake passage in the internal combustion engine to communicate with each other. The three-way catalyst is provided in the exhaust passage. The method includes: executing, by the electronic control unit, fuel cut control in which fuel injection in the internal combustion engine is stopped at a deceleration operation of the internal combustion engine; executing, by the electronic control unit, enrichment processing in which an air-fuel ratio of exhaust gas flowing into the three-way catalyst is lowered to a rich air-fuel ratio lower than a stoichiometric air-fuel ratio after the execution of the fuel cut control ends; executing, by the electronic control unit, an EGR control on the EGR device during the execution of the fuel cut control when a predetermined EGR condition is satisfied at a start of the execution of the fuel cut control; and controlling, by the electronic control unit, the air-fuel ratio of the exhaust gas flowing into the three-way catalyst such that the air-fuel ratio when the electronic control unit executes the EGR control during the execution of the fuel cut control and then executes the enrichment processing after the execution of the fuel cut control ends to be a higher air-fuel ratio in a range of the rich air-fuel ratio compared to the air-fuel ratio when the EGR control is not executed during the execution of the fuel cut control. The EGR control is control of introducing a portion of gas flowing through the exhaust passage into the intake passage through the EGR passage.

According to the aspect of the disclosure, in the configuration in which the exhaust passage of the internal combustion engine is provided with the three-way catalyst, the exhaust gas control function of the three-way catalyst can be more suitably recovered after the end of the execution of the fuel cut control.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, a specific embodiment of the disclosure will be described with reference to the drawings. The dimensions, materials, shapes, relative arrangement, and the like of components described in the present embodiment are not intended to limit the technical scope of the disclosure solely to the above-described ones unless otherwise specified.

Embodiment

Schematic Configuration

Figure 1:
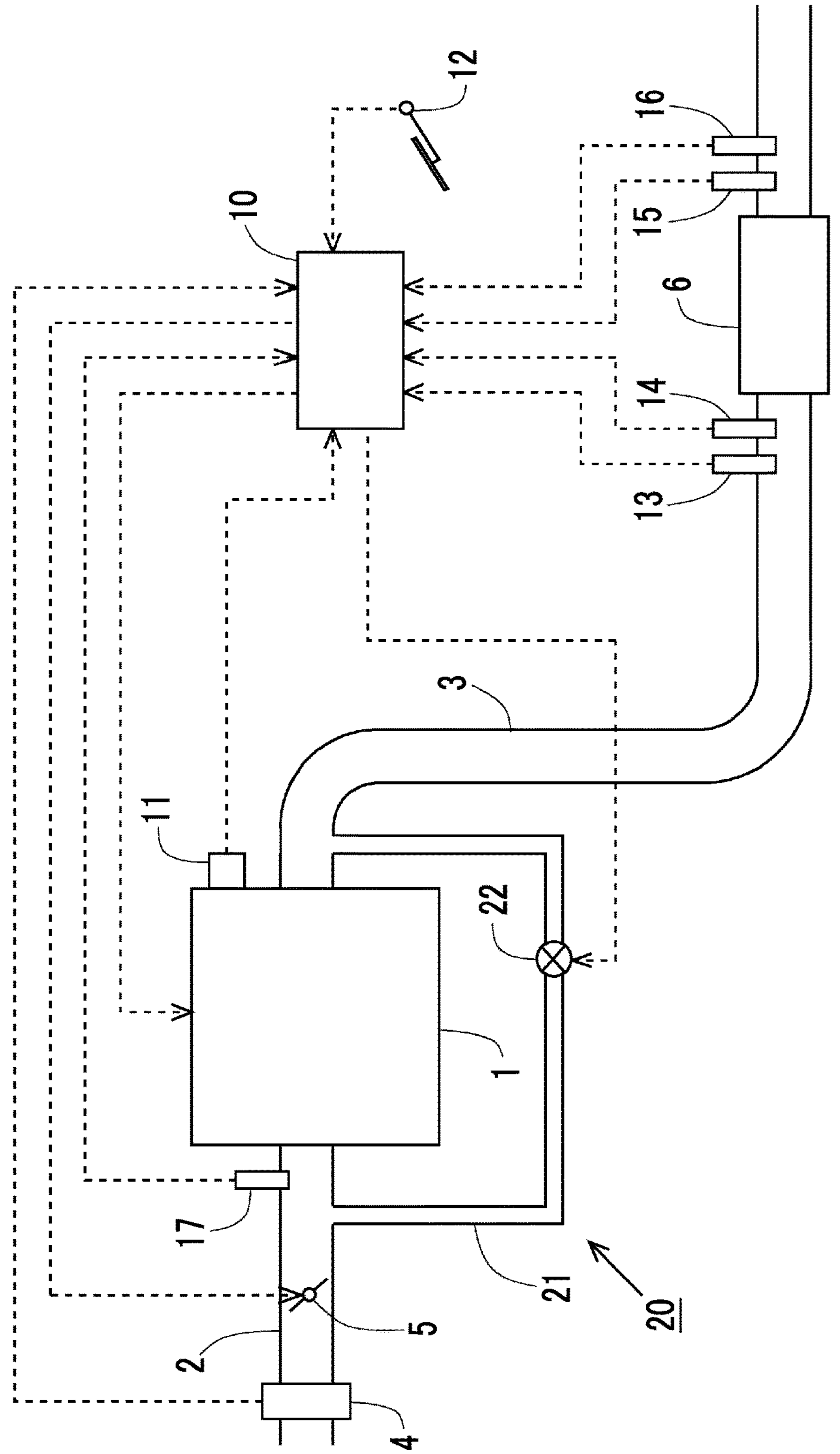
FIG. 1 is a view illustrating a schematic configuration of an intake and exhaust system of an internal combustion engine related to an embodiment.

Here, a case where the disclosure is applied to an exhaust gas control system of a gasoline engine for driving a vehicle will be described as an example. FIG. 1 is a view illustrating a schematic configuration of an intake and exhaust system of an internal combustion engine 1 related to the present embodiment. The internal combustion engine 1 is a gasoline engine for driving a vehicle. An intake passage 2 and an exhaust passage 3 are connected to the internal combustion engine 1.

The intake passage 2 is provided with an air flow meter 4. The air flow meter 4 detects the amount of intake air of the internal combustion engine 1. Additionally, a throttle valve 5 is provided in the intake passage 2 downstream of the air flow meter 4. The throttle valve 5 changes the flow passage cross-sectional area of the intake passage 2, thereby controlling the amount of air flowing into the internal combustion engine 1. Additionally, the intake passage 2 downstream of the throttle valve 5 is provided with a pressure sensor 17. The pressure sensor 17 detects an intake pressure within the intake passage 2.

The exhaust passage 3 is provided with a three-way catalyst 6 serving as an exhaust gas control catalyst. The exhaust passage 3 upstream of the three-way catalyst 6 is provided with an upstream air-fuel ratio sensor 13 and an oxygen concentration sensor 14. The upstream air-fuel ratio sensor 13 detects the air-fuel ratio of exhaust gas (inflow exhaust gas) flowing into the three-way catalyst 6 or gas (inflow gas) flowing into the three-way catalyst 6. The oxygen concentration sensor 14 detects the oxygen concentration of the inflow exhaust gas or the inflow gas. Additionally, the exhaust passage 3 downstream of the three-way catalyst 6 is provided with a downstream air-fuel ratio sensor 15 and a temperature sensor 16. The downstream air-fuel ratio sensor 15 detects the air-fuel ratio of exhaust gas (hereinafter may be referred to as "outflow exhaust gas") flowing out of the three-way catalyst 6 or gas (hereinafter may be referred to as "outflow gas") flowing out of the three-way catalyst 6. The temperature sensor 16 detects the temperature of the outflow exhaust gas or the outflow gas.

Additionally, in order to execute the EGR control of introducing a portion of gas (exhaust gas) flowing through the exhaust passage 3 into the intake passage 2, an EGR device 20 is installed in the intake and exhaust system of the internal combustion engine 1. The EGR device 20 includes an EGR passage 21 and an EGR valve 22. The EGR passage 21 is a passage that allows the exhaust passage 3 and the intake passage 2 to communicate with each other. A first end of the EGR passage 21 is connected to a portion of the exhaust passage 3 upstream of the three-way catalyst 6. Additionally, a second end of the EGR passage 21 is connected to a portion of the intake passage 2 downstream of the throttle valve 5. In addition, it is also possible to adopt a configuration in which the first end of the EGR passage 21 is connected to the portion of the exhaust passage 3 downstream of the three-way catalyst 6. The EGR passage 21 is provided with the EGR valve 22. By opening and closing the EGR valve 22, the EGR passage 21 is opened or blocked. Also, when the EGR passage 21 is opened by opening the EGR valve 22, a portion of gas (exhaust gas) flowing through the exhaust passage 3 is introduced into the intake passage 2 through the EGR passage 21.

Additionally, the internal combustion engine 1 is provided with an electronic control unit (ECU) 10 for controlling the internal combustion engine 1. The air flow meter 4, the pressure sensor 17, the upstream air-fuel ratio sensor 13, the oxygen concentration sensor 14, the downstream air-fuel ratio sensor 15, and the temperature sensor 16 are electrically connected to the ECU 10. Moreover, a crank angle sensor 11 and a throttle valve opening degree sensor 12 are electrically connected to the ECU 10. The crank angle sensor 11 outputs a signal having a correlation with the crank angle of the internal combustion engine 1. The throttle valve opening degree sensor 12 outputs a signal having a correlation with the throttle valve opening degree of a vehicle on which the internal combustion engine 1 is mounted.

Detection values of the above respective sensors are input to the ECU 10. The ECU 10 derives the engine speed of the internal combustion engine 1 based on a detection value of the crank angle sensor 11. Additionally, the ECU 10 derives the engine load of the internal combustion engine 1 based on a detection value of the throttle valve opening degree sensor 12. Additionally, the ECU 10 estimates the temperature of the three-way catalyst 6 based on a detection value of the temperature sensor 16. Additionally, a fuel injection valve (not illustrated), the throttle valve 5, and the EGR valve 22 of the internal combustion engine 1 are electrically connected to the ECU 10. The above devices are controlled by the ECU 10.

Fuel Cut Control, EGR Control, and Enrichment Processing

In the internal combustion engine 1 related to the present embodiment, when the operational state of the internal combustion engine 1 is brought into a deceleration operation, the fuel cut control of stopping the fuel injection from the fuel injection valve is executed. Here, when the fuel cut control is executed, fresh air flowing into the internal combustion engine 1 is discharged from the internal combustion engine 1, and flows into the three-way catalyst 6. For that reason, a large amount of oxygen is supplied to the three-way catalyst 6. In this case, when the temperature of the three-way catalyst 6 at a time when the execution of the fuel cut control is started is relatively high, there is a case where an oxidation reaction in the three-way catalyst 6 is temporarily promoted during the execution of the fuel cut control. In this case, there is a possibility that deterioration of the three-way catalyst 6 may proceed because the temperature of the three-way catalyst 6 rises excessively.

In the exhaust gas control system related to the present embodiment, in a case where the temperature of the three-way catalyst 6 when the execution condition of the fuel cut control is satisfied is equal to or higher than a predetermined temperature, the EGR control is executed by the ECU 10 during the execution of the fuel cut control. Here, the predetermined temperature is a temperature at which it is possible to determine that there is a possibility that the temperature of the three-way catalyst 6 rises excessively during the execution of the fuel cut control when the EGR control is not executed during the execution of the fuel cut control. Additionally, the EGR control is executed by opening the EGR valve 22 to open the EGR passage 21.

When the EGR control is executed during the execution of the fuel cut control, gas containing the exhaust gas (burnt gas) discharged from the internal combustion engine 1 immediately before start of the execution of the fuel cut control circulates through the exhaust passage 3, the EGR passage 21, and the intake passage 2. Then, the gas containing the burnt gas flows through the exhaust passage 3, and flows into the three-way catalyst 6. Hence, in a case where the EGR control is executed during the execution of the fuel cut control, the oxygen concentration of the inflow gas during the execution of the fuel cut control can be lowered compared to that in a case where the EGR control is not executed during the execution of the fuel cut control. According to this, the oxidation reaction in the three-way catalyst 6 during the execution of the fuel cut control can be more effectively suppressed. As a result, since the temperature rise of the three-way catalyst 6 can be more effectively suppressed, the proceeding of deterioration of the three-way catalyst 6 can be more effectively suppressed.

Additionally when the fuel cut control is executed, a large amount of oxygen is held by the three-way catalyst 6. As the result, while the three-way catalyst 6 is in an oxygen excess state after the end of the execution of the fuel cut control, it becomes difficult for the three-way catalyst 6 to sufficiently exhibit its exhaust gas control function. In order to eliminate the oxygen excess state of the three-way catalyst 6, there is a need for consuming the oxygen by oxidizing fuel components in the exhaust gas with the oxygen held by the three-way catalyst 6 after the end of the execution of the fuel cut control.

In the exhaust gas control system related to the present embodiment, in order to eliminate the oxygen excess state of the three-way catalyst 6 after the end of the execution of the fuel cut control, the enrichment processing of making the air-fuel ratio of the inflow exhaust gas lower than a stoichiometric air-fuel ratio is executed. By executing the enrichment processing, it is possible to supply a larger amount of fuel components than in a normal state (that is, when the air-fuel ratio of the inflow exhaust gas is controlled to be the stoichiometric air-fuel ratio) to the three-way catalyst 6. For that reason, the oxygen held by the three-way catalyst 6 can be consumed at an earlier stage. Hence, after the end of the execution of the fuel cut control, the state of the three-way catalyst 6 can be recovered to a state where the exhaust gas control function of the three-way catalyst 6 can be sufficiently exhibited at an earlier stage.

However, in a case where the enrichment processing is executed after the end of the execution of the fuel cut control, there is a case that a slip-through fuel component, which is a fuel component slipping through the three-way catalyst 6 without being oxidized in the three-way catalyst 6, is produced. Particularly, in a case where the EGR control is executed during the execution of the fuel cut control, when the enrichment processing is executed after the end of the execution of the fuel cut control similar to the case where the EGR control is not executed during the execution of the fuel cut control, an increase in the slip-through fuel component is apt to occur. This is because, in the case where the EGR control is executed during the execution of the fuel cut control and in the case where the EGR control is not executed during the execution of the fuel cut control, oxygen holding states in the three-way catalyst 6 at the end of the execution of the fuel cut control are brought into different states.

That is, as described above, in the case where the EGR control is executed during the execution of the fuel cut control, the oxygen concentration of the inflow gas during the execution of the fuel cut control decreases compared to that in the case where the EGR control is not executed during the execution of the fuel cut control. For that reason, during the execution of the fuel cut control, the collision frequency of oxygen against an oxygen holding material in the three-way catalyst 6 decreases. As a result, oxygen is easily held solely in a portion near a surface layer in the three-way catalyst 6. Meanwhile, since the oxygen concentration of the inflow gas during the execution of the fuel cut control is relatively high in the case where the EGR control is not executed during the execution of the fuel cut control, oxygen is easily held inside the three-way catalyst 6 as well as the portion near the surface layer in the three-way catalyst 6. Therefore, in the enrichment processing to be executed after the end of the execution of the fuel cut control, when the air-fuel ratio of the inflow exhaust gas in the case where the EGR control is executed during the execution of the fuel cut control is lowered to the same extent as the air-fuel ratio in the case where the EGR control is not executed during the execution of the fuel cut control, there is a case where the amount of supply of fuel components per unit time to the three-way catalyst 6 increases excessively with respect to the oxygen holding state in the three-way catalyst 6. As a result, there is a possibility that the slip-through fuel component resulting from the enrichment processing will increase.

In the present embodiment, in the case where the EGR control is executed during the execution of the fuel cut control, a target air-fuel ratio of the inflow exhaust gas in the enrichment processing to be executed after the end of the execution of the fuel cut control is set to a higher value compared to that in the case where the EGR control is not executed during the execution of the fuel cut control. Accordingly, in the case where the EGR control is executed during the execution of the fuel cut control, the degree of enrichment of the inflow exhaust gas in the enrichment processing is made low.

Control Flow

Here, a control flow related to the present embodiment when the fuel cut control is executed and a control flow related to the present embodiment when the execution of the fuel cut control is ended and the enrichment processing is executed will be described based on flowcharts illustrated in FIGS. 2 and 3, respectively. The above flows are stored in advance in the ECU 10 as a program, and are realized by the program being executed by the ECU 10.

Figure 2:
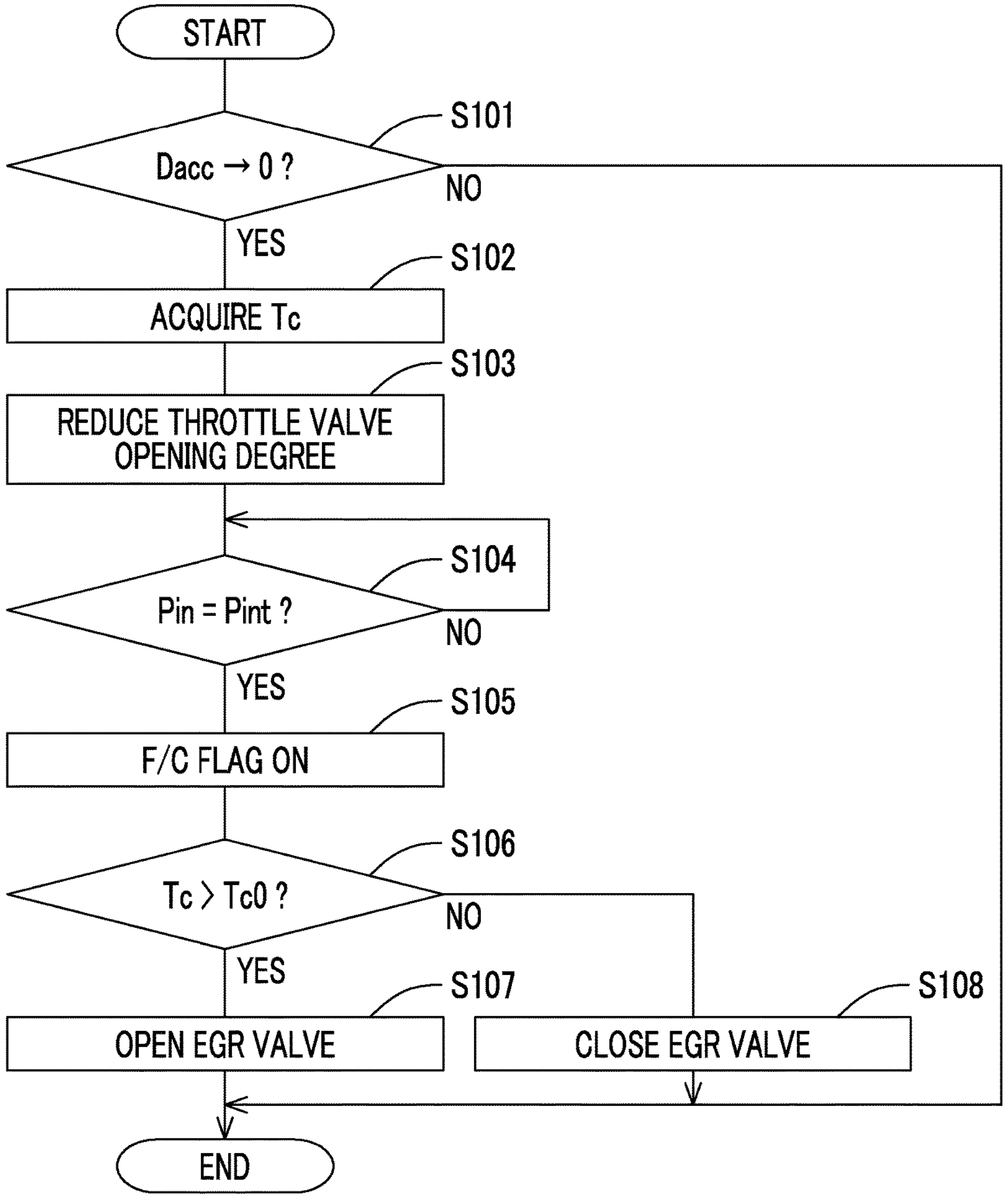
FIG. 2 is a flowchart illustrating a control flow related to the embodiment when fuel cut control is executed.

FIG. 2 is a flowchart illustrating the control flow when the fuel cut control is executed. This flow is executed by the ECU 10 during the operation of the internal combustion engine 1. In this flow, first, in S101, whether or not a throttle valve opening degree Dacc detected by the throttle valve opening degree sensor 12 is set to zero is determined. That is, in S101, whether or not the execution condition of the fuel cut control is satisfied (whether or not the deceleration operation to execute the fuel cut control is requested) is determined. In a case where a negative determination is made in S101, the execution of this flow is temporarily ended. On the other hand, in a case where a positive determination is made in S101, next, the processing of S102 is executed.

In S102, the temperature Tc of the three-way catalyst 6 at the present point is acquired. In addition, as described above, the temperature of the three-way catalyst 6 is estimated by the ECU 10 based on the detection value of the temperature sensor 16. Next, in S103, the opening degree of the throttle valve 5 is reduced. Here, the opening degree of the throttle valve 5 is reduced down to a target throttle opening degree in a predetermined fuel cut control. For example, the target throttle opening degree may be zero (that is, the throttle valve 5 may be controlled in a valve-closed state). Next, in S104, whether or not intake pressure Pin within the intake passage 2 downstream of the throttle valve 5, which is detected by the pressure sensor 17, reaches target intake pressure Pint corresponding to the target throttle opening degree is determined.

Next, a fuel cut flag (F/C flag) is turned on in S105. Accordingly the fuel cut control is executed by the fuel injection from the fuel injection valve in the internal combustion engine 1 being stopped. Next, in S106, whether or not the temperature Tc (that is, the temperature of the three-way catalyst 6 when the execution condition of the fuel cut control is satisfied) of the three-way catalyst 6 acquired in S102 is equal to or higher than a predetermined temperature Tc0 is determined. As described above, the predetermined temperature Tc0 is a temperature at which it is possible to determine that there is a possibility that the temperature of the three-way catalyst 6 rises excessively during the execution of the fuel cut control when the EGR control is not executed during the execution of the fuel cut control. The predetermined temperature Tc0 can be determined in advance based on experiment or the like.

In the present embodiment, it is an example of the "predetermined EGR condition" that the temperature Tc of the three-way catalyst 6 when the execution condition of the fuel cut control is satisfied is equal to or higher than the predetermined temperature Tc0. However, when the temperature of the gas flowing through the three-way catalyst 6 during the execution of the fuel cut control is relatively low and the flow rate of the gas is relatively large, the amount of heat carried away by the gas is increased. As a result, it is also considered that the temperature of the three-way catalyst 6 does not easily rise. For that reason, in consideration of the temperature and the flow rate of the gas flowing through the three-way catalyst 6 during the execution of the fuel cut control as well as the temperature of the three-way catalyst 6 when the execution condition of the fuel cut control is satisfied, the "predetermined EGR condition" may be determined.

In a case where a positive determination is made in S106, next, the EGR valve 22 is opened in S107. As a result, the EGR control using the EGR device 20 is executed. In the present embodiment, it is assumed that the EGR valve 22 is brought into a fully-opened state in this case. However, in this case, the opening degree Degr of the EGR valve 22 may be a predetermined intermediate opening degree. On the other hand, in a case where a negative determination is made in S106, next, in S108, the EGR valve 22 is maintained in a valve-closed state (when the EGR control is executed immediately before the execution of the fuel cut control, the EGR valve 22 is closed in S108).

Figure 3:
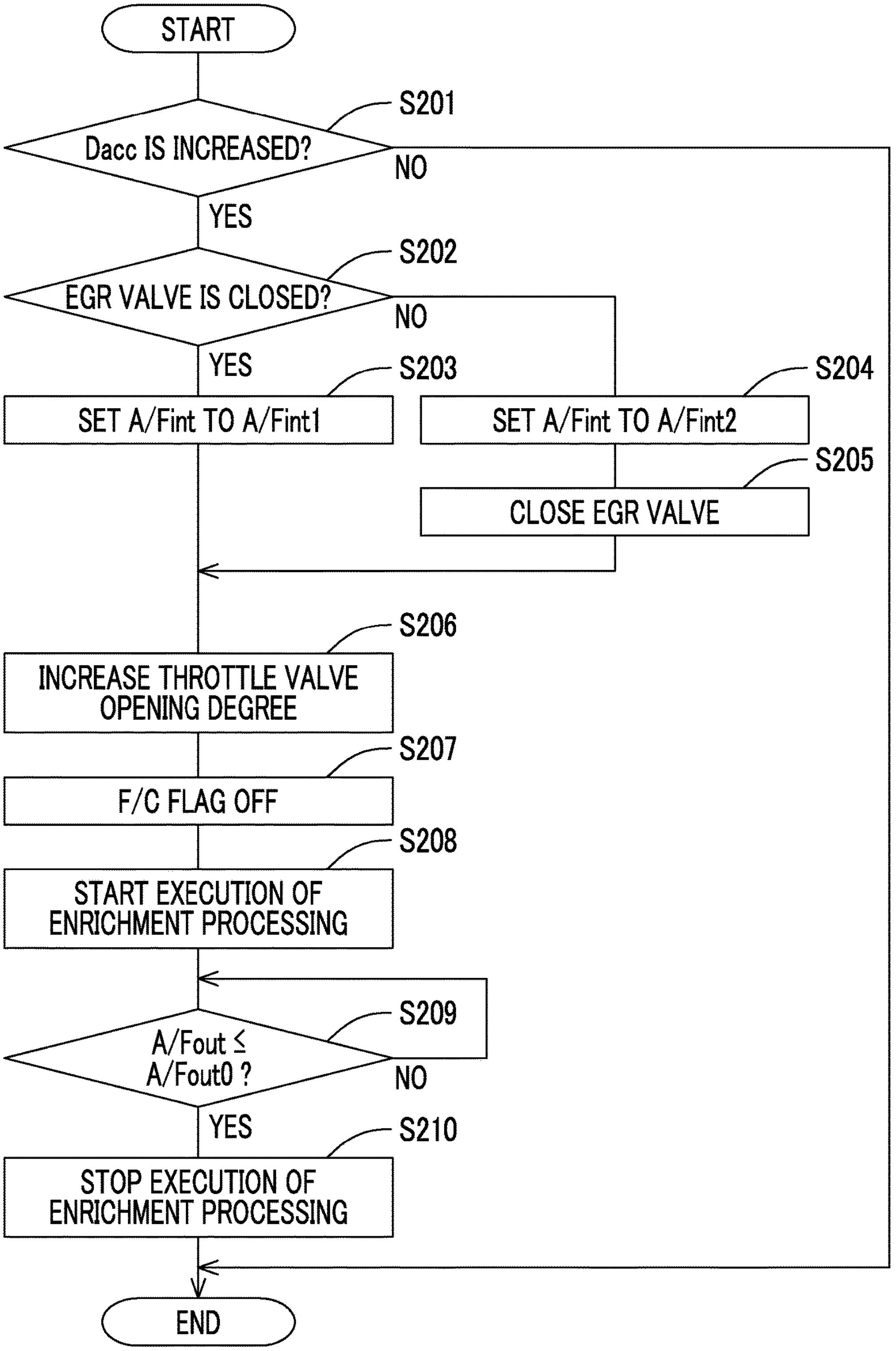
FIG. 3 is a flowchart illustrating a control flow related to the embodiment when the execution of the fuel cut control is ended and enrichment processing is executed.

FIG. 3 is a flowchart illustrating the control flow when the execution of the fuel cut control is ended and the enrichment processing is executed. This flow is executed by the ECU 10 during the execution of the fuel cut control. In this flow, first, in S201, whether or not the throttle valve opening degree Dacc detected by the throttle valve opening degree sensor 12 is increased (whether or not the throttle valve opening degree Dacc is larger than zero) is determined. That is, in S201, whether or not the execution end condition of the fuel cut control is satisfied is determined. In a case where a negative determination is made in S201, the execution of this flow is temporarily ended. In this case, the fuel cut control that is currently executed is continued. On the other hand, in a case where a positive determination is made in S201, next, the processing of S202 is executed.

In S202, whether or not the EGR valve 22 is brought into a valve-closed state during the execution of the fuel cut control is determined. In a case where a positive determination is made in S202, that is, in a case where the EGR valve 22 is brought into the valve-closed state, it is possible to determine that the EGR control is not executed during the execution of the fuel cut control. In this case, next, in S203, a target air-fuel ratio A/Fint of the inflow exhaust gas in the enrichment processing to be executed after the end of the execution of the fuel cut control is set to a first target rich air-fuel ratio A/Fint1. The processing of S206 is executed after S203.

On the other hand, in a case where a negative determination is made in S202, that is, in a case where the EGR valve 22 is brought into a valve-opened state, it is possible to determine that the EGR control is executed during the execution of the fuel cut control. In this case, next, in S204, the target air-fuel ratio A/Fint of the inflow exhaust gas in the enrichment processing to be executed after the end of the execution of the fuel cut control is set to a second target rich air-fuel ratio A/Fint2. Here, both of the first target rich air-fuel ratio A/Fint1 and the second target rich air-fuel ratio A/Fint2 are rich air-fuel ratios lower than the stoichiometric air-fuel ratio, and are air-fuel ratios that are determined in advance based on experiment or the like in the enrichment processing as suitable air-fuel ratios. Then, the second target rich air-fuel ratio A/Fint2 is determined as a value higher than the first target rich air-fuel ratio A/Fint1. After S204, in S205, the EGR valve 22 is closed. Accordingly, the execution of the EGR control is ended. Next, the processing of S206 is executed.

In S206, the opening degree of the throttle valve 5 is increased. Here, the opening degree of the throttle valve 5 is increased up to the target throttle opening degree corresponding to the engine load according to the throttle valve opening degree Dacc. Next, the fuel cut flag (F/C flag) is turned off in S207. Accordingly, the execution of the fuel cut control is ended by the fuel injection from the fuel injection valve in the internal combustion engine 1 being resumed. Next, the execution of the enrichment processing is started in S208. That is, the amount of fuel injected into the internal combustion engine 1 is adjusted such that the air-fuel ratio of the inflow exhaust gas detected by the upstream air-fuel ratio sensor 13 becomes the target air-fuel ratio A/Fint set in S203 or S204. As a result, in a case where the EGR control is not executed during the execution of the fuel cut control, the air-fuel ratio of the inflow exhaust gas during the execution of the enrichment processing is controlled to be the first target rich air-fuel ratio A/Fint1. Additionally, in the case where the EGR control is executed during the execution of the fuel cut control, the air-fuel ratio of the inflow exhaust gas during the execution of the enrichment processing is controlled to be the second target rich air-fuel ratio A/Fint2. Then, by starting the execution of the enrichment processing, fuel components are supplied to the three-way catalyst 6 together with the exhaust gas, and the oxygen held by the three-way catalyst 6 begins to be consumed for the oxidation of the fuel components.

Next, in S209, whether or not the air-fuel ratio A/Fout of the outflow exhaust gas detected by the downstream air-fuel ratio sensor 15 is equal to or lower than an enrichment stop air-fuel ratio A/Fout0 that is an air-fuel ratio used as a threshold value for stopping the enrichment processing is determined. Here, while the fuel components supplied to the three-way catalyst 6 by the enrichment processing being executed are oxidized by the oxygen held by the three-way catalyst 6, the air-fuel ratio of the outflow exhaust gas is maintained at the stoichiometric air-fuel ratio. Then, when all the oxygen held by the three-way catalyst 6 is consumed for the oxidation of the fuel components, the slip-through fuel component is generated. Therefore, the air-fuel ratio of the outflow exhaust gas becomes a rich air-fuel ratio lower than the stoichiometric air-fuel ratio. Then, the enrichment stop air-fuel ratio A/Fout0 is the rich air-fuel ratio lower than the stoichiometric air-fuel ratio, and is determined in advance based on experiment or the like as an air-fuel ratio from which all the oxygen held by the three-way catalyst 6 can be determined to be consumed for the oxidation of the fuel components. In a case where a negative determination is made in S209, the processing of the above S209 is executed again. That is, the enrichment processing is continued. On the other hand, in a case where a positive determination is made in S209, next, the enrichment processing is stopped in S210. That is, the amount of fuel injected from the fuel injection valve in the internal combustion engine 1 is reduced down to an amount corresponding to the engine load according to the throttle valve opening degree Dacc.

Time Chart

Figure 4:
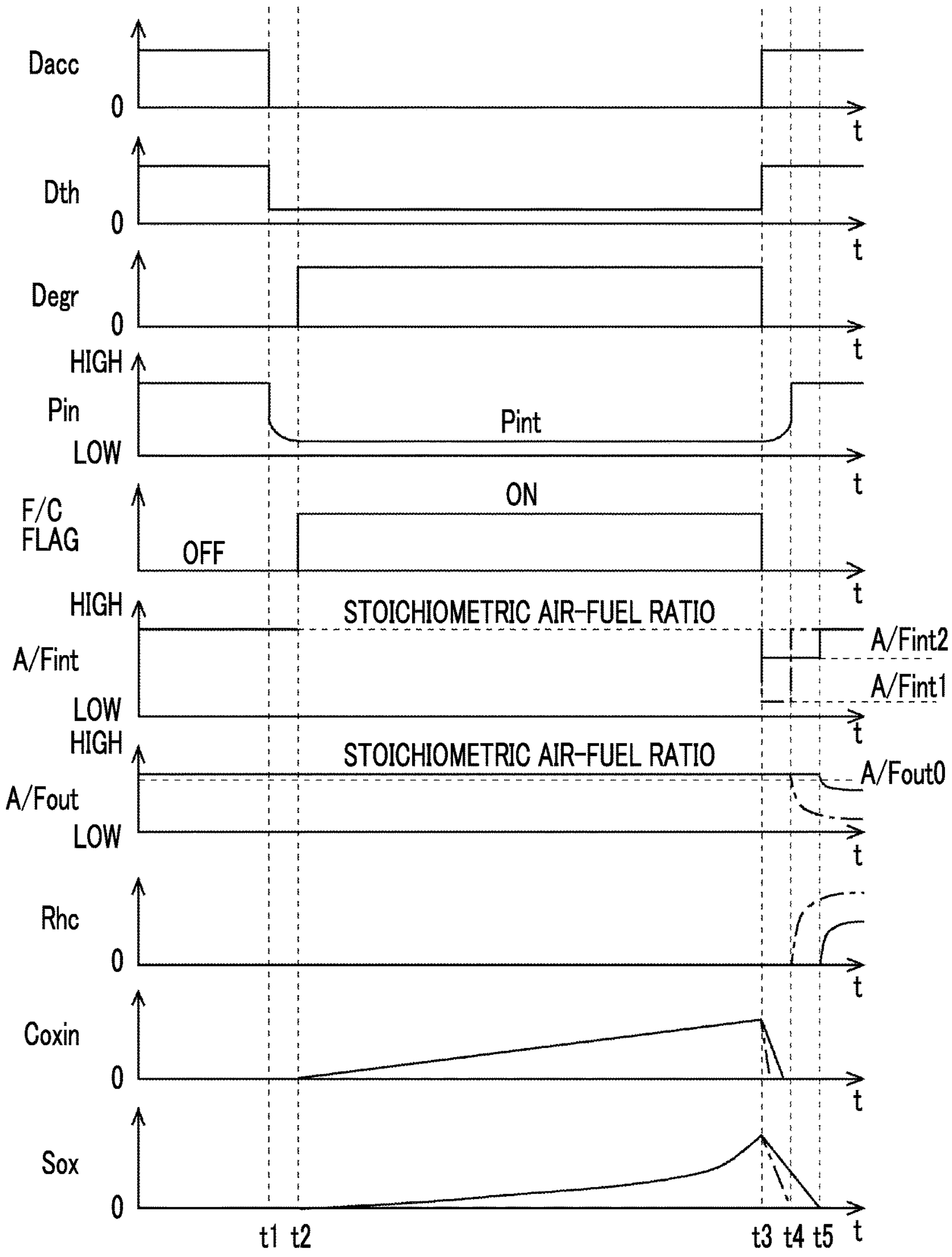
FIG. 4 is a time chart illustrating the time shift of respective parameters when EGR control is executed during the execution of the fuel cut control and enrichment processing is executed after the end of the execution of the fuel cut control, by executing the control flows illustrated in FIGS. 2 and 3.

The time shift of the respective parameters when executing the control flows illustrated in FIGS. 2 and 3 will be described with reference to FIG. 4. FIG. 4 is a time chart illustrating the time shift of the respective parameters when the EGR control is executed during the execution of the fuel cut control and the enrichment processing is executed after the end of the execution of the fuel cut control, by executing the control flows illustrated in FIGS. 2 and 3. Hence, in any graph of FIG. 4, the horizontal axis represents time. Additionally, in FIG. 4, solid lines show the shift of the respective parameters when executing the control flows illustrated in FIGS. 2 and 3. Meanwhile, in FIG. 4, as in the related art, one-dot chain lines show the shift of the respective parameters in a case where the target air-fuel ratio of the inflow exhaust gas in the enrichment processing is set to the same value (that is, the first target rich air-fuel ratio) as that in the case where the EGR control is not executed during the execution of the fuel cut control and the enrichment processing is executed.

In FIG. 4, the throttle valve opening degree Dacc is zero at time t1. Accordingly, the execution condition of the fuel cut control is satisfied. For that reason, at time t1, an opening degree Dth of the throttle valve 5 is reduced down to the target throttle opening degree in the predetermined fuel cut control. Accordingly, the intake pressure Pin within the intake passage 2 downstream of the throttle valve 5 drops. In addition, although the illustration in FIG. 4 is omitted, the temperature Tc of the three-way catalyst 6 is equal to or higher than the predetermined temperature Tc0 at time t1.

The intake pressure Pin that began to drop from time t1 reaches the target intake pressure Pint corresponding to the target throttle opening degree in the fuel cut control at time t2. In addition, when the opening degree Dth of the throttle valve 5 is reduced down to the target throttle opening degree in the fuel cut control by the execution condition of the fuel cut control being satisfied, in order to reduce the torque shock in the internal combustion engine 1, the opening degree Dth of the throttle valve 5 may be reduced down to the target throttle opening degree in a plurality of divided stages.

When the intake pressure Pin reaches the target intake pressure Pint at time t2, the fuel cut flag (F/C flag) is turned on. Accordingly, the execution of the fuel cut control is started. Additionally, the EGR valve 22 is opened at time t2. That is, the opening degree Degr of the EGR valve 22 is increased. Accordingly, the execution of the EGR control is started. In addition, the target air-fuel ratio A/Fint of the inflow exhaust gas is set to the stoichiometric air-fuel ratio as usual until time t2.

Here, when the execution of the EGR control is started together with the fuel cut control at time t2, as described above, the gas containing the burnt gas circulates through the exhaust passage 3, the EGR passage 21, and the intake passage 2 and begins to flow into the three-way catalyst 6. In this case, the ratio of the burnt gas in the inflow gas decreases gradually with the lapse of time. As a result, an oxygen concentration Coxin of the inflow gas increases gradually after time t2. Additionally, an oxygen holding amount SOx in the three-way catalyst 6 also increases gradually. In addition, in this case, the increase rate (the increase amount of the oxygen holding amount SOx per unit time) of the oxygen holding amount SOx in the three-way catalyst 6 becomes large as the oxygen concentration Coxin of the inflow gas rises.

Then, at time t3, the throttle valve opening degree Dacc becomes larger than zero. Accordingly, the execution end condition of the fuel cut control is satisfied. For that reason, at time t3, the opening degree Dth of the throttle valve 5 is increased up to the target throttle opening degree corresponding to the engine load according to the throttle valve opening degree Dacc. Accordingly, the intake pressure Pin within the intake passage 2 downstream of the throttle valve 5 rises.

Additionally, at time t3, the fuel cut flag (F/C flag) is controlled to be OFF. Accordingly, the execution of the fuel cut control is ended. That is, the fuel injection from the fuel injection valve in the internal combustion engine 1 is resumed. Additionally, the EGR valve 22 is closed at time t3. Accordingly, the execution of the EGR control is ended.

Moreover, the execution of the enrichment processing is started from time t3. Here, in FIG. 4, the EGR control is executed during the execution of the fuel cut control. For that reason, in the present embodiment, by executing the control flow illustrated in FIG. 3, as indicated by solid lines in FIG. 4, the target air-fuel ratio A/Fint of the inflow exhaust gas in the enrichment processing is set to the second target rich air-fuel ratio A/Fint2. Then, when the execution of the enrichment processing is started at time t3, the oxygen holding amount SOx in the three-way catalyst 6 begins to decrease.

Then, in the present embodiment, as indicated by a solid line in FIG. 4, all the oxygen held by the three-way catalyst 6 at time t5 is consumed for the oxidation of the fuel components, and the oxygen holding amount SOx in the three-way catalyst 6 is zero. Then, since the slip-through fuel component is generated, a concentration Rhc of HC (fuel component) in the outflow exhaust gas after time t5 becomes larger than zero. For that reason, the air-fuel ratio A/Fout of the outflow exhaust gas maintained at the stoichiometric air-fuel ratio until time t becomes the rich air-fuel ratio after time t5. As a result, when the air-fuel ratio A/Fout of the outflow exhaust gas is equal to or lower than the enrichment stop air-fuel ratio A/Fout0, the execution of the enrichment processing is stopped. Hence, in the present embodiment, the execution of the enrichment processing is stopped at time t5. Then, after time t5, the target air-fuel ratio A/Fint of the inflow exhaust gas is set to the stoichiometric air-fuel ratio as usual. However, even when the execution of the enrichment processing is stopped at time t5, after time t5, the air-fuel ratio A/Fout of the outflow exhaust gas temporarily becomes the rich air-fuel ratio while a fuel component discharged from the internal combustion engine 1 during the execution of the enrichment processing slips through the three-way catalyst 6. For that reason, in FIG. 4, after time t5, the air-fuel ratio A/Fout of the outflow exhaust gas becomes the rich air-fuel ratio, and the concentration Rhc of HC in the outflow exhaust gas is larger than zero.

On the other hand, as indicated by a one-dot chain line in FIG. 4, in a case where the target air-fuel ratio A/Fint of the inflow exhaust gas in the enrichment processing is set to the first target rich air-fuel ratio A/Fint1 lower than the second target rich air-fuel ratio A/Fint2, when the execution of the enrichment processing is started at time t3, the oxygen holding amount SOx in the three-way catalyst 6 begins to decrease more rapidly than that in the case (solid line) of the present embodiment. For that reason, in this case, the oxygen holding amount SOx in the three-way catalyst 6 is zero at time t4 earlier than time t5. As a result, since the slip-through fuel component is generated at time t4, the concentration Rhc of HC in the outflow exhaust gas after time t4 becomes larger than zero. Then, the air-fuel ratio A/Fout of the outflow exhaust gas becomes the rich air-fuel ratio after time t4. As a result, when the air-fuel ratio A/Fout of the outflow exhaust gas is equal to or lower than the enrichment stop air-fuel ratio A/Fout0, the execution of the enrichment processing is stopped. Hence, in the present embodiment, the execution of the enrichment processing is stopped at time t4. However, even in this case, after time t4, the air-fuel ratio A/Fout of the outflow exhaust gas temporarily becomes the rich air-fuel ratio while a fuel component discharged from the internal combustion engine 1 during the execution of the enrichment processing slips through the three-way catalyst 6.

In this case, as described above, when the air-fuel ratio of the inflow exhaust gas in the enrichment processing is lowered down to the first target rich air-fuel ratio A/Fint1 even in the case where the EGR control is executed during the execution of the fuel cut control, the amount of supply of the fuel components per unit time to the three-way catalyst 6 increases excessively with respect to the oxygen holding state in the three-way catalyst 6. For that reason, the concentration Rhc of HC in the outflow exhaust gas indicated by a one-dot chain line after time t4 in FIG. 4 is higher than the concentration Rhc of HC in the outflow exhaust gas indicated by a solid line after time t5 in FIG. 4.

As can be seen from the comparison of the concentrations Rhc of HC in the outflow exhaust gases indicated by the solid line and one-dot chain line in FIG. 4 described above, in the case where the EGR control is executed during the execution of the fuel cut control, the target air-fuel ratio of the inflow exhaust gas in the enrichment processing to be executed after the end of the execution of the fuel cut control is set to a higher value compared to that in the case where the EGR control is not executed during the execution of the fuel cut control. Accordingly, an increase in the slip-through fuel component accompanying the execution of the enrichment processing can be more effectively suppressed. Additionally, in the case where the EGR control is executed during the execution of the fuel cut control, the fuel components for sufficiently consuming the oxygen held by the three-way catalyst 6 in the enrichment processing can be supplied to the three-way catalyst 6, even when the target air-fuel ratio of the inflow exhaust gas in the enrichment processing is set to a higher value compared to that in the case where the EGR control is not executed during the execution of the fuel cut control.

Hence, according to the enrichment processing related to the present embodiment, the state of the three-way catalyst 6 can be recovered to a state where the exhaust gas control function of the three-way catalyst 6 can be sufficiently exhibited as early as possible while an increase in the slip-through fuel component is more effectively suppressed, after the end of the execution of the fuel cut control. Hence, the exhaust gas control function of the three-way catalyst 6 can be more suitably recovered after the end of the execution of the fuel cut control.

In the present embodiment, when the fuel cut flag (F/C flag) is turned on in S105 of the flow illustrated in FIG. 2, the fuel cut control is executed by stopping the fuel injection from the fuel injection valve in the internal combustion engine 1, and fuel cut flag (F/C flag) is turned off in S207 of the flow illustrated in FIG. 3, the fuel cut control is executed by the ECU 10 that terminates the execution of the fuel cut control by resuming the fuel injection from the fuel injection valve in the internal combustion engine 1. Additionally, in the present embodiment, the enrichment processing is executed by the ECU 10 that starts the execution of the enrichment processing in S208 of the flow illustrated in FIG. 3 and that adjusts the amount of fuel injected into the internal combustion engine 1 such that the air-fuel ratio of the inflow exhaust gas becomes the target air-fuel ratio A/Fint set in S203 or S204.

Additionally, in the enrichment processing, the execution of the enrichment processing is continued until the oxygen holding amount SOx in the three-way catalyst 6 is zero. However, there is no need for configuring the aspect of the disclosure as above. For example, when the enrichment processing is executed, the enrichment processing may be executed for a predetermined period.

Modification Example

Here, a modification example of the enrichment processing related to the present embodiment will be described. As described above, in the case where the EGR control is executed by the ECU 10 during the execution of the fuel cut control, since the gas containing the burnt gas discharged from the internal combustion engine 1 immediately before the start of the execution of the fuel cut control flows into the three-way catalyst 6, the oxygen concentration of the inflow gas can be lowered. For that reason, in the case where the EGR control is executed during the execution of the fuel cut control, the oxygen concentration of the inflow gas during the execution of the fuel cut control varies according to the operational state of the internal combustion engine 1 immediately before the start of the execution of the fuel cut control, the amount of intake air of the internal combustion engine 1 during the execution of the fuel cut control, or the like. Then, when the oxygen concentration of the inflow gas during the execution of the fuel cut control varies, the oxygen holding state in the three-way catalyst 6 at the end of the execution of the fuel cut control is also brought into a different state.

Figure 5:
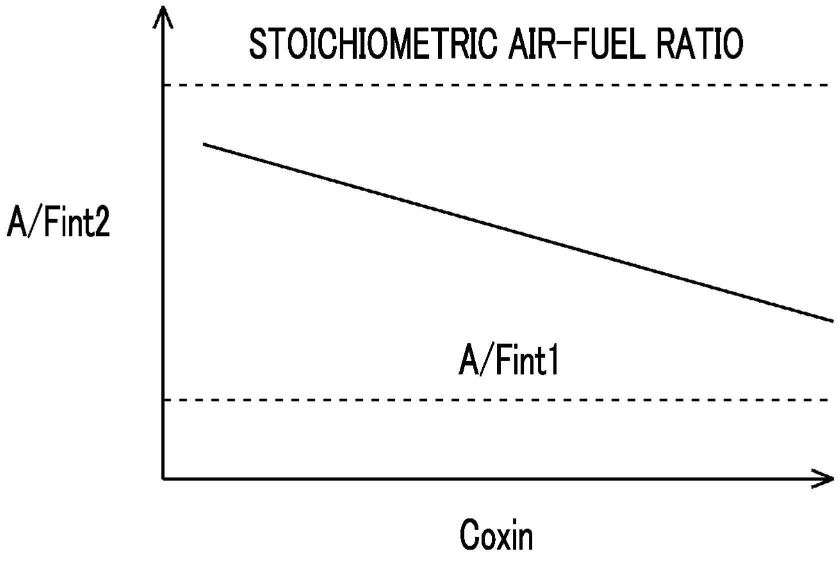
FIG. 5 is a graph illustrating a correlation between the oxygen concentration Coxin of inflow gas when the execution of the fuel cut control is ended and a second target rich air-fuel ratio A/Fint2, related to a modification example of the embodiment.

In the enrichment processing related to the present modification example, in the case where the EGR control is executed during the execution of the fuel cut control, the target air-fuel ratio (that is, the second target rich air-fuel ratio) of the inflow exhaust gas in the enrichment processing to be executed after the end of the fuel cut control is set to a different value based on the oxygen concentration of the inflow gas at the end of the execution of the fuel cut control. FIG. 5 is a graph illustrating a correlation between the oxygen concentration Coxin of the inflow gas when the execution of the fuel cut control is ended and the second target rich air-fuel ratio A/Fint2, related to the present modification example. As illustrated in the graph, in the enrichment processing related to the present modification example, the second target rich air-fuel ratio A/Fint2 is set to a higher air-fuel ratio as the oxygen concentration Coxin of the inflow gas at the end of the execution of the fuel cut control is lower, in a range higher than the first target rich air-fuel ratio A/Fint1 in the range of the rich air-fuel ratio. In addition, there is no need for linearly changing the second target rich air-fuel, ratio A/Fint2 with respect to the oxygen concentration Coxin of the inflow gas at the end of the execution of the fuel cut control, and the value of the second target rich air-fuel ratio A/Fint2 may be changed in a stepwise manner. That is, when the oxygen concentration Coxin of the inflow gas at the end of the execution of the fuel cut control is low, the second target rich air-fuel ratio A/Fint2 may be set to a higher value compared to when the oxygen concentration Coxin of the inflow gas is high.

In the present modification example, a correlation between the oxygen concentration Coxin of the inflow gas when the execution of the fuel cut control is ended and the second target rich air-fuel ratio A/Fint2, as illustrated in FIG. 5, is stored in advance as a map or a function in the ECU 10. Then, in S204 of the flow illustrated in FIG. 3, when the target air-fuel ratio A/Fint of the inflow exhaust gas in the enrichment processing is set to the second target rich air-fuel ratio A/Fint2, the second target rich air-fuel ratio A/Fint2 is calculated by using the map or function.

By setting the second target rich air-fuel ratio A/Fint2 as described above, in the enrichment processing in the case where the EGR control is executed during the execution of the fuel cut control, the state of the three-way catalyst 6 can be recovered to a state where the exhaust gas control function of the three-way catalyst 6 can be sufficiently exhibited as early as possible while an increase in the slip-through fuel component is more effectively suppressed.

What is claimed is:

1. An exhaust gas control system of an internal combustion engine, the exhaust gas control system comprising:

an EGR device including an EGR passage, and the EGR passage being provided to allow an exhaust passage and an intake passage in the internal combustion engine to communicate with each other;

a three-way catalyst provided in the exhaust passage; and an electronic control unit configured to execute fuel cut control in which fuel injection in the internal combustion engine is stopped at a deceleration operation of the internal combustion engine, the electronic control unit being configured to execute enrichment processing in which an air-fuel ratio of exhaust gas flowing into the three-way catalyst is lowered to a rich air-fuel ratio lower than a stoichiometric air-fuel ratio after the execution of the fuel cut control ends;

the electronic control unit being configured to execute EGR control on the EGR device during the execution of the fuel cut control when a predetermined EGR condition is satisfied at a start of the execution of the fuel cut control, the EGR control being control of introducing a portion of gas flowing through the exhaust passage into the intake passage through the EGR passage, and the electronic control unit being configured to control the air-fuel ratio of the exhaust gas flowing into the three-way catalyst such that the air-fuel ratio when the electronic control unit executes the EGR control during the execution of the fuel cut control and then executes the enrichment processing after the execution of the fuel cut control ends to be a higher air-fuel ratio in a range of the rich air-fuel ratio compared to the air-fuel ratio when the EGR control is not executed during the execution of the fuel cut control.

2. The exhaust gas control system according to claim 1, wherein when the electronic control unit executes the EGR control during the execution of the fuel cut control and then executes the enrichment processing after the execution of the fuel cut control ends, the electronic control unit is configured to control the air-fuel ratio of the exhaust gas flowing into the three-way catalyst such that the air-fuel ratio when an oxygen concentration of the gas flowing into the three-way catalyst at the end of the execution of the fuel cut control is low to be the higher air-fuel ratio in the range of the rich air-fuel ratio compared to the air-fuel ratio when the oxygen concentration of the gas is high.

3. A method of controlling an exhaust gas control system of an internal combustion engine, the exhaust gas control system including an EGR device, a three-way catalyst, and an electronic control unit, the EGR device including an EGR passage, the EGR passage being provided to allow an exhaust passage and an intake passage in the internal combustion engine to communicate with each other, and the three-way catalyst being provided in the exhaust passage, the method comprising:

executing, by the electronic control unit, fuel cut control in which fuel injection in the internal combustion engine is stopped at a deceleration operation of the internal combustion engine;

executing, by the electronic control unit, enrichment processing in which an air-fuel ratio of exhaust gas flowing into the three-way catalyst is lowered to a rich air-fuel ratio lower than a stoichiometric air-fuel ratio after the execution of the fuel cut control ends;

executing, by the electronic control unit, an EGR control on the EGR device during the execution of the fuel cut control when a predetermined EGR condition is satisfied at a start of the execution of the fuel cut control, the EGR control being control of introducing a portion of gas flowing through the exhaust passage into the intake passage through the EGR passage; and controlling, by the electronic control unit, the air-fuel ratio of the exhaust gas flowing into the three-way catalyst such that the air-fuel ratio when the electronic control unit executes the EGR control during the execution of the fuel cut control and then executes the enrichment processing after the execution of the fuel cut control ends to be a higher air-fuel ratio in a range of the rich air-fuel ratio compared to the air-fuel ratio when the EGR control is not executed during the execution of the fuel cut control.

* * * * *

UNITED STATES PATENT AND TRADEMARK OFFICE

CERTIFICATE OF CORRECTION

PATENT NO. : 10,400,695 B2
APPLICATION NO. : 15/858326
DATED : September 3, 2019
INVENTOR(S) : Yuji Yamaguchi and Yoshihisa Shinoda It is certified that error appears in the above-identified patent and that said Letters Patent is hereby corrected as shown below:

In the Specification

In Column 3, Line 40, after “excessively”, insert --,--.

In Column 3, Line 62, after “Additionally”, insert --,--.

In Column 10, Line 40, after “Accordingly”, insert --,--.

In Column 16, Line 41, after “air-fuel”, delete “,”.

Signed and Sealed this
Twenty-ninth Day of October, 2019

Andrei Iancu
*Director of the United States Patent and Trademark Office*